United States Patent
Sugano et al.

(10) Patent No.: US 9,846,477 B2
(45) Date of Patent: Dec. 19, 2017

(54) DEVICE AND METHOD OF CONTROLLING LOCK AND UNLOCK MODES OF DISPLAY OF COMPUTER

(71) Applicant: FUJITSU LIMITED, Kawasaki-shi, Kanagawa (JP)

(72) Inventors: Hiroyasu Sugano, Koto (JP); Tatsuro Matsumoto, Yokohama (JP); Daisuke Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 14/554,623

(22) Filed: Nov. 26, 2014

(65) Prior Publication Data
US 2015/0153863 A1    Jun. 4, 2015

(30) Foreign Application Priority Data

Nov. 29, 2013    (JP) .................................. 2013-248349

(51) Int. Cl.
*G06F 3/041*    (2006.01)
*G06F 1/32*    (2006.01)
*G06F 3/0488*    (2013.01)
*H04M 1/67*    (2006.01)

(52) U.S. Cl.
CPC .......... *G06F 1/3262* (2013.01); *G06F 3/0488* (2013.01); *H04M 1/67* (2013.01)

(58) Field of Classification Search
CPC ... G06F 3/0488; G06F 3/04847; G06F 1/3262
See application file for complete search history.

(56) References Cited

U.S. PATENT DOCUMENTS

| | | | |
|---|---|---|---|
| 2005/0274796 | A1 | 12/2005 | Miyashita |
| 2009/0280872 | A1* | 11/2009 | Kajiya ................... H04M 1/67 455/574 |
| 2012/0212431 | A1* | 8/2012 | Brinda .................. G06F 3/0488 345/173 |

(Continued)

FOREIGN PATENT DOCUMENTS

| | | |
|---|---|---|
| JP | 2005-354550 | 12/2005 |
| JP | 2009-272996 | 11/2009 |

(Continued)

OTHER PUBLICATIONS

Japanese Office Action dated May 9, 2017 for corresponding Japanese Patent Application No. 2013-248349.

*Primary Examiner* — Kwang-Su Yang
(74) *Attorney, Agent, or Firm* — Staas & Halsey LLP

(57) ABSTRACT

A method of controlling a computer including a display screen, the computer having a plurality of modes with respect to the display screen, includes: determining that the computer is set to a first lock mode after inactivity during a non-lock mode over a first time period before a second lock mode is set, the first lock mode, the second lock mode, and the non-lock mode being from among the plurality of modes; switching the computer from the first lock mode to the second lock mode when after inactivity over a second time period subsequent to the first time period; and returning, by a processor in the computer, the computer from the first lock mode to the non-lock mode when an input designating a position included in a certain area of the display screen is detected within the second time period.

20 Claims, 10 Drawing Sheets

(56) References Cited

U.S. PATENT DOCUMENTS

| | | | |
|---|---|---|---|
| 2012/0293821 A1 | 11/2012 | Chiba | |
| 2013/0189952 A1* | 7/2013 | Kim | H04W 12/00 |
| | | | 455/411 |
| 2013/0249843 A1* | 9/2013 | Yano | G06F 3/0488 |
| | | | 345/173 |
| 2014/0189604 A1* | 7/2014 | Garrison | G06F 3/0488 |
| | | | 715/863 |
| 2015/0026613 A1* | 1/2015 | Kwon | G06F 3/04886 |
| | | | 715/764 |
| 2015/0121316 A1* | 4/2015 | Chang | G06F 3/04883 |
| | | | 715/863 |

FOREIGN PATENT DOCUMENTS

| | | |
|---|---|---|
| JP | 2011-090617 | 5/2011 |
| JP | 2012-243158 | 12/2012 |

\* cited by examiner

DEVICE AND METHOD OF CONTROLLING LOCK AND UNLOCK MODES OF DISPLAY OF COMPUTER

CROSS-REFERENCE TO RELATED APPLICATION

This application is based upon and claims the benefit of priority of the prior Japanese Patent Application No. 2013-248349, filed on Nov. 29, 2013, the entire contents of which are incorporated herein by reference.

FIELD

The embodiments discussed herein are related to a technique of controlling a mode of a device.

BACKGROUND

Electronic devices equipped with touch panel displays, such as smart phones or tablets have widely been used. The electronic device can be generally set to enter a lock mode when the device is not operated for a predetermined time. After the shift to the lock mode, the touch panel display is also turned off. Upon detection of a touch operation and the like on the touch panel display by a user in the lock mode, the touch panel display is turned on to display an entry screen to prompt the user to make an entry for cancelling the lock mode. Upon detection of a user's entry of a password, a passcode or a pattern which is registered in advance, the electronic device exits from the lock mode.

When the device is set to enter the lock mode within a short period of time, the user is forced to often enter the password, the passcode or the pattern to cancel the lock mode, which results in an increase in user's load. To reduce such load, many users set their devices not to enter the lock mode or set a long period of time to enter the lock mode.

Meanwhile, the following setting is also popular: when not operated for a predetermined time, the device enters a sleep mode before entering a lock mode; and then enters the lock mode if not operated for another predetermined time after the shift to the sleep mode. If a user wants to cancel the sleep mode, the user has only to perform a touch operation on the touch panel display. A related technique is disclosed by Japanese Laid-open Patent Publication No. 2009-272996, for example.

SUMMARY

According to an aspect of the invention, a method of controlling in a computer including a display screen, the computer having a plurality of modes with respect to the display screen, includes: determining that the computer is set to a first lock mode after inactivity during a non-lock mode over a first time period before a second lock mode is set, the first lock mode, the second lock mode, and the non-lock mode being from among the plurality of modes; switching the computer from the first lock mode to the second lock mode when after inactivity over a second time period subsequent to the first time period; and returning, by a processor in the computer, the computer from the first lock mode to the non-lock mode when an input designating a position included in a certain area of the display screen is detected within the second time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

DESCRIPTION OF EMBODIMENTS

Figure 1:
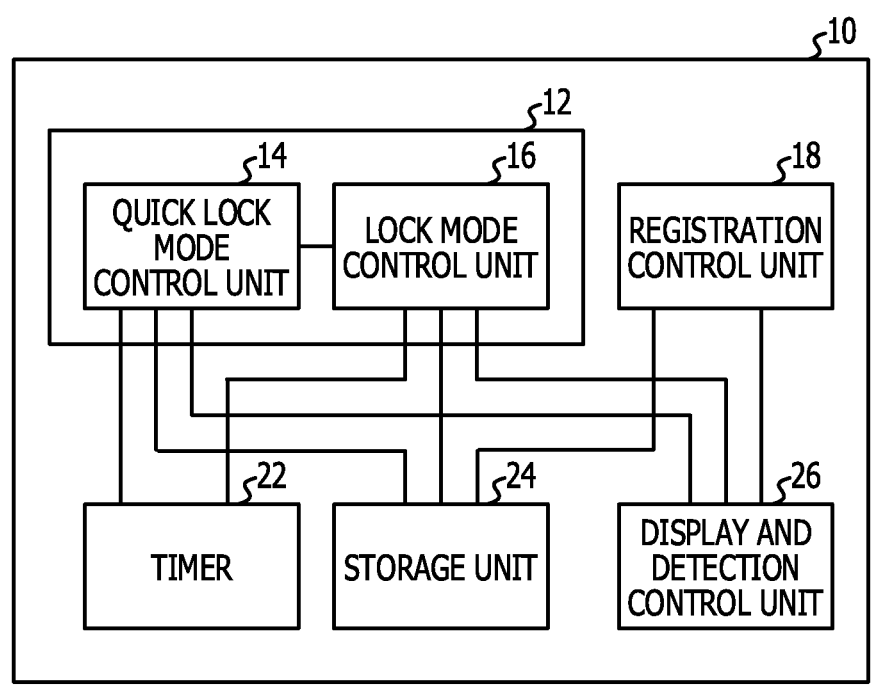
FIG. 1 is a block diagram illustrating an example of functions of main units in a smart device according to an embodiment.

The sleep mode is easier to cancel than the lock mode, but has difficulty in protecting the electronic device from operation by other people.

One aspect of the disclosed technique has an object to provide a quick lock mode which can be cancelled with a less load than a lock mode without impairment of a protection function.

Hereinafter, an exemplar embodiment of the disclosed technique is described in detail by referring to the drawings. It is noted that a smart device is described as an example of electronic devices related to the disclosed technique, but the disclosed technique is not limited to the smart device. For example, the disclosed technique is applicable to various kinds of electronic devices such as personal computers, game machines, car navigation systems, mobile phones, and digital cameras.

First Embodiment

A smart device 10 illustrated in FIG. 1 as an example includes a protection mode control unit 12, a registration control unit 18, a timer 22, a storage unit 24, and a display and detection control unit 26. The protection mode control unit 12 includes a quick lock mode control unit 14 and a lock mode control unit 16. The quick lock mode control unit 14 and the lock mode control unit 16 are coupled to each other.

Furthermore, each of the quick lock mode control unit 14 and the lock mode control unit 16 is coupled to the timer 22, the storage unit 24, and the display and detection control unit 26. The registration control unit 18 is coupled to the storage unit 24 and the display and detection control unit 26.

The quick lock mode control unit 14 as a control unit performs various kinds of controls when the smart device 10 enters a quick lock mode. The lock mode control unit 16 performs various kinds of controls when the smart device 10 enters a lock mode.

The registration control unit 18 performs control such that a specific region for cancelling the quick lock mode can be registered in the storage unit 24. The display and detection control unit 26 performs control such that information indicating user's operations detected by a detection unit can be applied to various kinds of processing and a display unit can display various kinds of information. The timer 22 measures an elapsed time after the smart device 10 enters the quick lock mode, for example.

Figure 2:
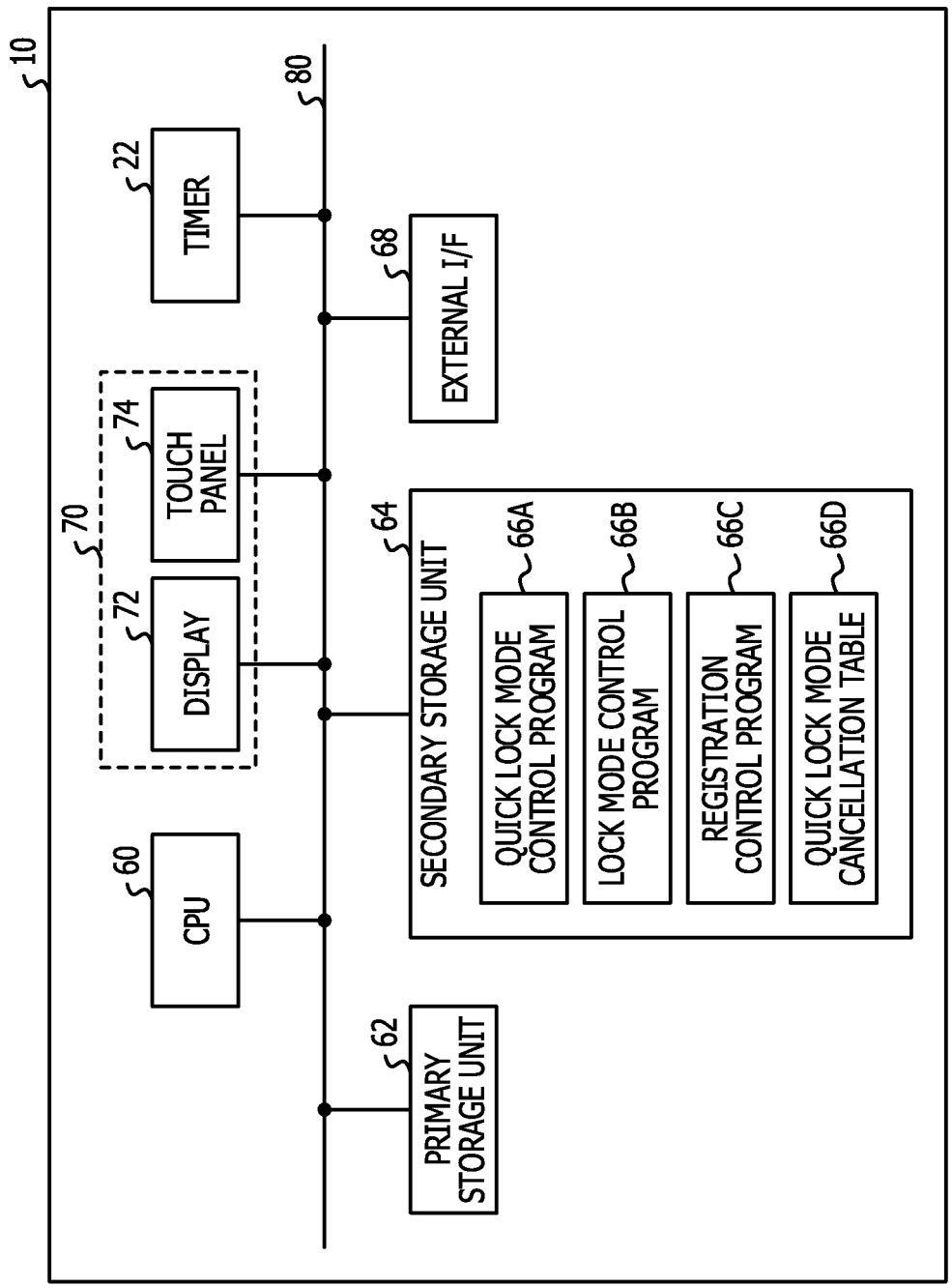
FIG. 2 is a block diagram illustrating an example of a configuration of an electric system of the smart device according to the embodiment.

The smart device 10 as illustrated in FIG. 2 as an example includes a central processing unit (CPU) 60, a primary storage unit 62, a secondary storage unit 64, a touch panel display 70, a timer 22, and an external interface 68. The CPU 60, the primary storage unit 62, the secondary storage unit 64, the touch panel display 70, the timer 22, and the external interface 68 are coupled to each other through a bus 80.

The touch panel display 70 includes a display 72 serving as the display unit and a touch panel 74 serving as the detection unit. The display 72 displays various kinds of information and the touch panel 74 detects an operation of an operator. As illustrated in FIGS. 4A to 4D, FIG. 6, FIG. 8, and FIG. 10, the display 72 and the touch panel 74 are put on top of one another to form the touch panel display 70. The external interface 68 is coupled to an external device so as to manage transmission and reception of various kinds of information between the external device and the CPU 60. The operator is a user or another person other than the user. The user is a person having a legitimate right to the smart device 10, such as an owner of the smart device 10.

The primary storage unit 62 is a volatile memory such as a random access memory (RAM). The secondary storage unit 64 is a nonvolatile memory, such as a hard disk drive (HDD) or a solid state drive (SSD). The primary storage unit 62 and the secondary storage unit 64 function as the storage unit 24 in FIG. 1.

As one example, the secondary storage unit 64 stores a quick lock mode control program 66A, a lock mode control program 66B, a registration control program 66C, and a quick lock mode cancellation table 68. The CPU 60 loads the quick lock mode control program 66A, the lock mode control program 66B, and the registration control program 66C from the secondary storage unit 64 and expands them to the primary storage unit 62. The CPU 60 executes the quick lock mode control program 66A to operate as the quick lock mode control unit 14 in FIG. 1. The CPU 60 executes the lock mode control program 66B to operate as the lock mode control unit 16 in FIG. 1. Moreover, the CPU 60 executes the registration control program 66C to operate as the registration control unit 18 in FIG. 1. In the quick lock mode cancellation table 68, a specific region for cancelling the quick lock mode is registered.

(Specific Region Registration Processing)

Figure 3:
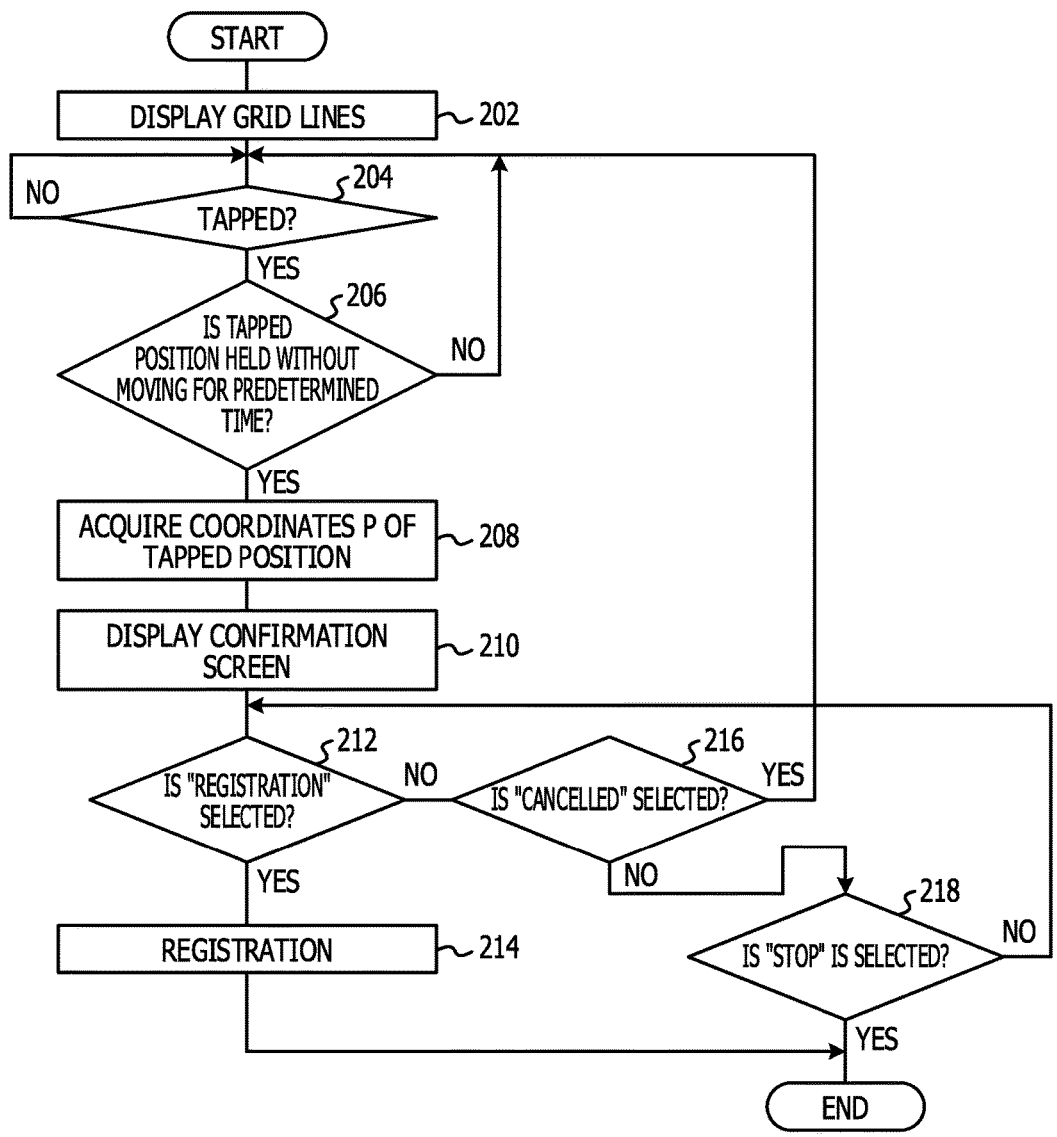
FIG. 3 is a flowchart illustrating an example of a flow of specific region registration processing according to the embodiment.

With reference to FIG. 3, description is hereinafter provided for specific region registration processing, as one operation of the embodiment of the disclosed technique, which is performed by the smart device 10 with the CPU 60 executing the registration control program 66C.

In the specific region registration processing, a specific region for cancelling the quick lock mode is registered in the quick lock mode cancellation table 68.

The smart device 10 has a lock function. The smart device 10 includes the touch panel display 70. For example, when the touch panel 74 does not detect a user's operation for a predetermined time (for example, 15 seconds) or longer while the quick lock mode is not cancelled, the lock function operates to shift to the lock mode. After entering the lock mode, the smart device 10 does not accept any operation other than a predetermined one and powers off the display 72.

When the smart device 10 is in the lock mode, the user cancels the lock mode by entering a password, a passcode or the like which is registered in advance. Frequent entering of the password, the passcode or the like imposes such a high load that some users set a long period of time (for example, 30 minutes) to enter the lock mode.

However, when the time to enter the lock mode is set long, a function to protect the smart device 10 from an illegitimate operation of another person is not sufficiently operated. On the other hand, the quick lock mode of the disclosed technique can be cancelled with a less load than that for canceling the lock mode. For example, when the touch panel 74 does not detect a user's operation for a predetermined time (for example, 15 seconds) or longer, the smart device 10 enters the quick lock mode. Then, as similar to the lock mode, the smart device 10 does not accept any operation other than a predetermined one and powers off the display 72.

When the smart device 10 is in the quick lock mode, the user cancels the quick lock mode by performing a touch operation in the specific region of the display 72 which is registered in advance.

Figure 4A:
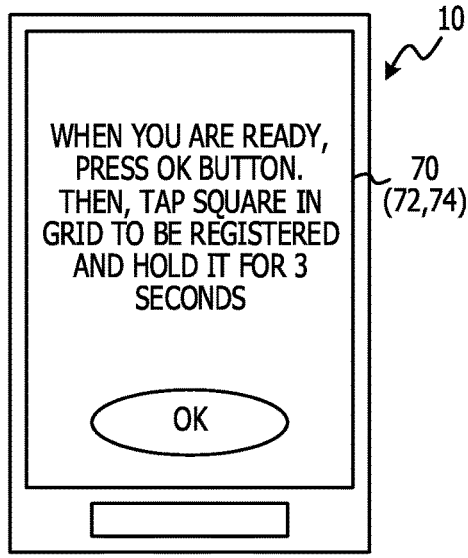
FIGS. 4A, 4B, 4C, and 4D are illustrations, each presenting a display example in the specific region registration processing according to the embodiment.
Figure 4B:
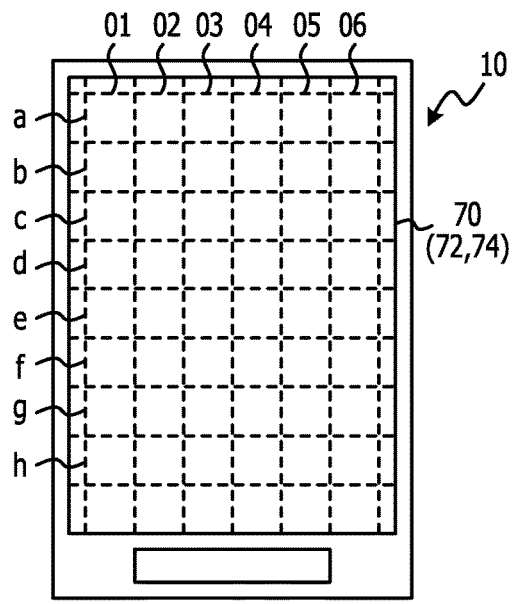

In order to register the specific region, for example, the CPU 60 determines whether it is detected that a user performs a touch operation, in other words, tapping on an "OK" button displayed on the touch panel display 70 of the smart device 10 illustrated in FIG. 4A. When the tapping is detected, the specific region registration processing is started. Then, at step 202, the touch panel display 70 is controlled to display a grid thereon as illustrated in FIG. 4B. A grid pitch may be 1 cm, for example, but the disclosed technique is not restrictive to this. For example, the grid pitch may be set to any length such as 1.5 cm or 2 cm, for example.

At step 204, it is determined whether user's tapping on the touch panel display 70 is detected. When the determination result is "yes" at step 204, it is determined at step 206 whether the user's tapping is kept held without moving for a predetermined time (for example, 3 seconds) or longer. When the determination result is "no" at step 206, the control is returned to step 204.

On the other hand, when the determination result is "yes" at step 206, the coordinates of the position tapped by the user on the touch panel display 70 are acquired at step 208.

Figure 4C:
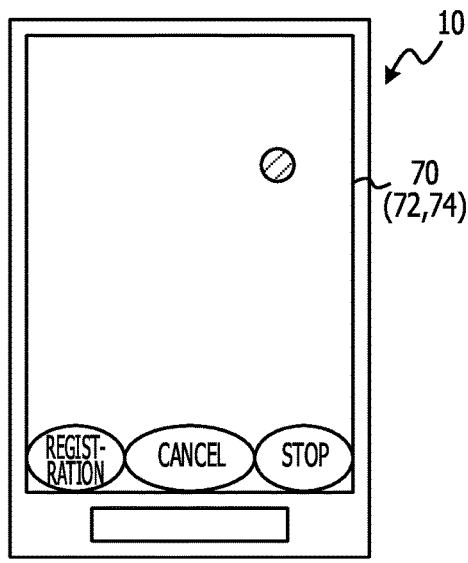
Figure 4D:
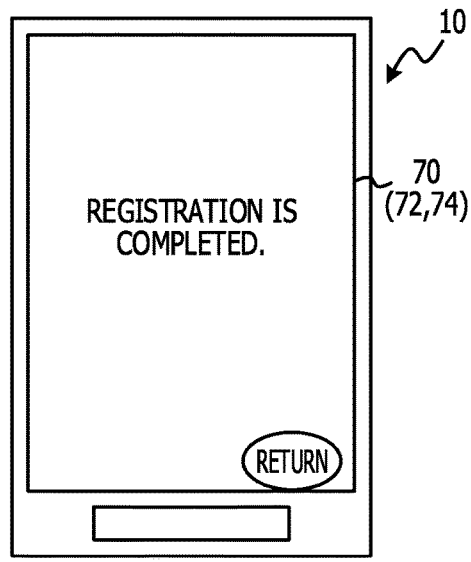

For example, when the acquired coordinates are within a region c05, a confirmation screen to prompt the user to confirm the region c05 tapped by the user is displayed on the display 72 at step 210, as illustrated in FIG. 4C. At step 212, it is determined whether the user taps a "registration" button displayed on the touch panel display 70. When the determination result is "yes" at step 212, at step 214, information indicating the region c05 is registered as a specific region for cancelling the quick lock mode in the quick lock mode cancellation table 68. After that, as illustrated in FIG. 4D, a screen informing that the specific region is registered is displayed on the touch panel display 70.

On the other hand, when the determination result is "no" at step 212, it is determined at step 216 whether the user taps a "cancel" button. When the determination result is "yes," the control is returned to step 204.

When the determination result is "no" at step 216, it is determined at step 218 whether the user taps a "stop" button. When the determination result is "yes," the specific region registration processing is terminated. When the determination result is "no" at step 218, the control is returned to step 212.

In the above description, when the touch panel 74 does not detect the user's operation for the predetermined time (for example, 15 seconds) or longer, a quick lock function operates to shift to the quick lock mode. However, the disclosed technique is not limited to this. For example, the smart device 10 may have an unillustrated hardware button, and may be configured to enter the quick lock mode when the hardware button is not operated by the user for a predetermined time or longer.

(Quick Lock Mode Control Processing)

Figure 5:
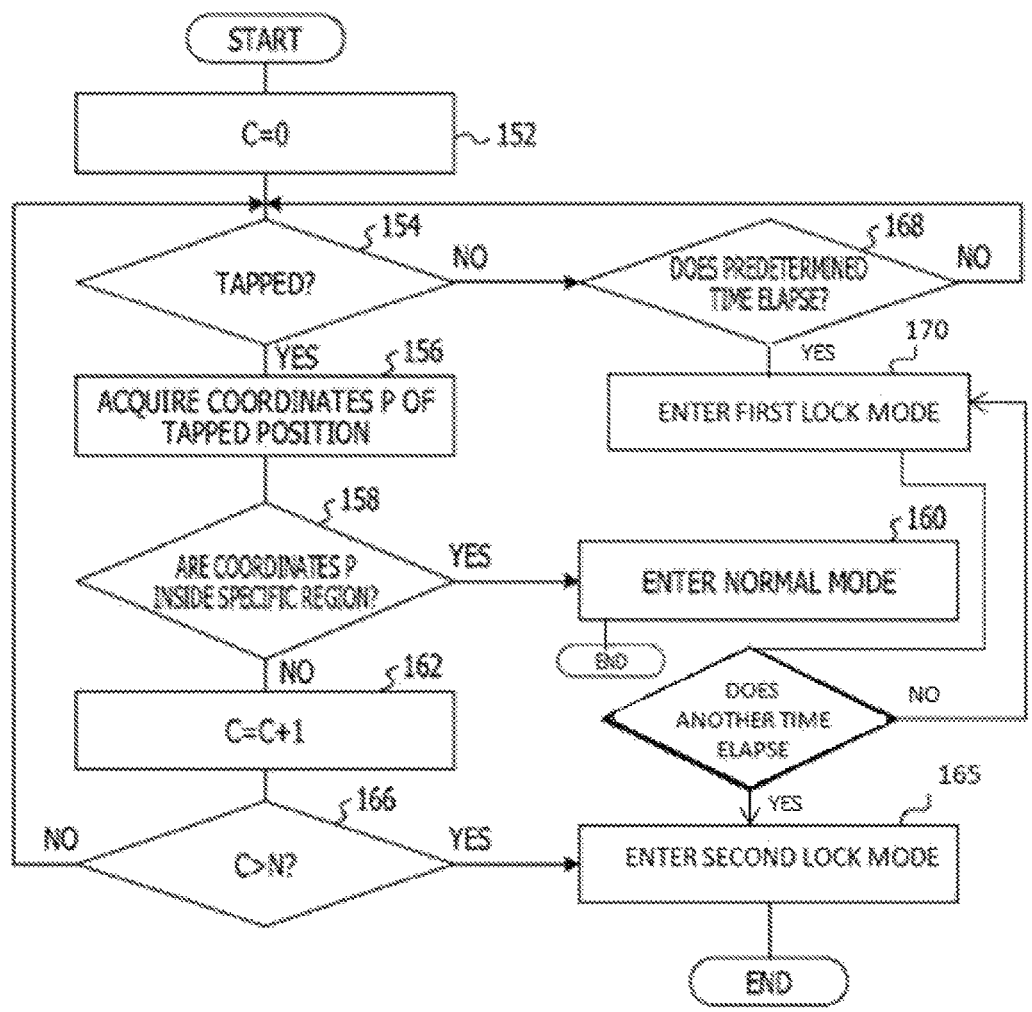
FIG. 5 is a flowchart illustrating an example of a flow of quick lock mode control processing according to a first embodiment.

With reference to FIG. 5, description is provided for quick lock mode control processing which is performed by the smart device 10 with the CPU 60 executing the quick lock mode control program 66A.

The quick lock mode control processing is started when the smart device 10 enters the quick lock mode. Specifically, when the touch panel display 70 does not detect any user's operation for a predetermined time or longer, the quick lock function operates to shift to the quick lock mode and to turn off the display 72. However, the touch panel 74 is kept turned on. When the quick lock mode control processing is started, "0" is set in a variable C for counting the number of times that user's tapping which is a touch operation is detected on a region other than the specific region at step 152.

At step 154, it is determined whether user's tapping is detected on the touch panel display 70. When the determination result is "no" at step 154, it is determined at step 168 whether a time measured by the timer 22 after the shift to the quick lock mode exceeds a predetermined time (for example, 5 minutes). When the determination result is "no" at step 168, the control is returned to step 154.

When the determination result is "yes" at step 154, the coordinates P of a position on the touch panel display 70, which is a touched region tapped by the user, are acquired at step 156.

Figure 6:
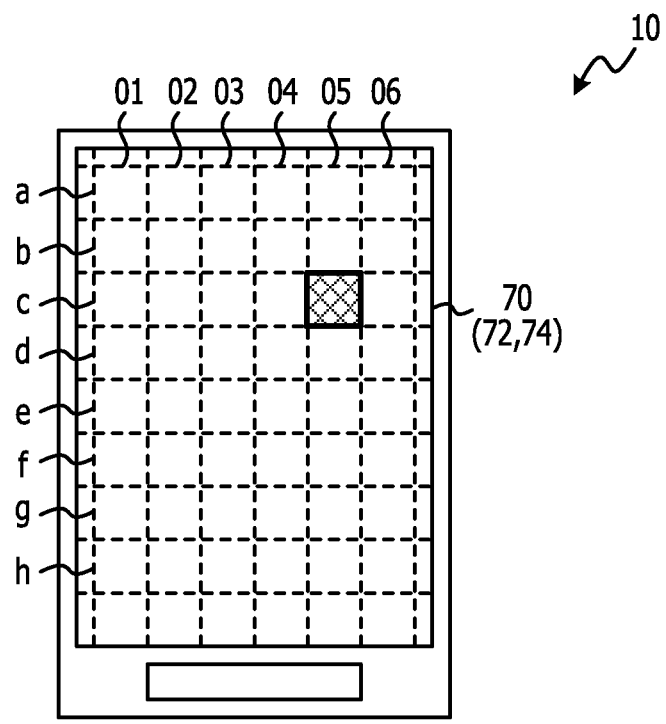
FIG. 6 is an illustration presenting an example of a specific region according to the first embodiment.

At step 158, it is determined whether the coordinates P are included inside the region c05 which is registered in the quick lock mode cancellation table 68 as the predetermined region for cancelling the quick lock mode illustrated in FIG. 6. When the determination result is "yes," the quick lock mode is cancelled and shifted to a normal mode and the display 72 is powered on at step 160. Then, the processing is terminated. It is noted that FIG. 6 is a diagram illustrating a specific region, and presents a grid and a region which is registered as the specific region for facilitating understanding. However, in the quick lock mode, the display 72 is turned off and does not display the grid.

On the other hand, when the determination result is "no" at step 158, the variable C is incremented by 1 at step 162. At step 164, it is determined whether a value contained in the variable C is larger than a certain preset number of times N. When the determination result is "no" at step 164, the control is returned to step 154.

On the other hand, when the determination result is "yes" at step 164, this means that the region other than the specific region is tapped more than the predetermined number of times N, and the smart device 10 enters the lock mode at step 166. Also, when the determination result is "yes" at step 168, in other words, when a predetermined time (for example, 5 minutes) elapses without the touch panel display 70 tapped after the shift to the quick lock mode, the smart device 10 enters the lock mode at step 170.

The disclosed technique enables the quick lock mode to be cancelled upon detection of a touch operation in the specific region which is stored in advance. The operation of cancelling the quick lock mode imposes a less load on a user than in the case of cancelling the lock mode, but other people who do not know the specific region may have much more difficulty in cancelling the quick lock mode than in cancelling the sleep mode. The disclosed technique provides the quick lock mode which imposes a less load for cancellation than the lock mode without impairment of the protection function. Thus, the utilization of the protection function by the user is promoted. This is because the quick lock mode lowers the barrier to setting the smart device 10 to enter the quick lock mode when the touch panel 74 does not detect a user's operation for a relatively short time (for example, 15 seconds) or longer.

Furthermore, in the disclosed technique, when the predetermined time elapses after the shift to the quick lock mode, or when the touch operation is performed in the region other than the specific region more than the predetermined number of times, the smart device 10 enters the lock mode. Accordingly, the protection function is enhanced.

Second Embodiment

In a second embodiment, the components described in the first embodiment are given the same reference numerals, and are omitted in explanation.

Figure 7:
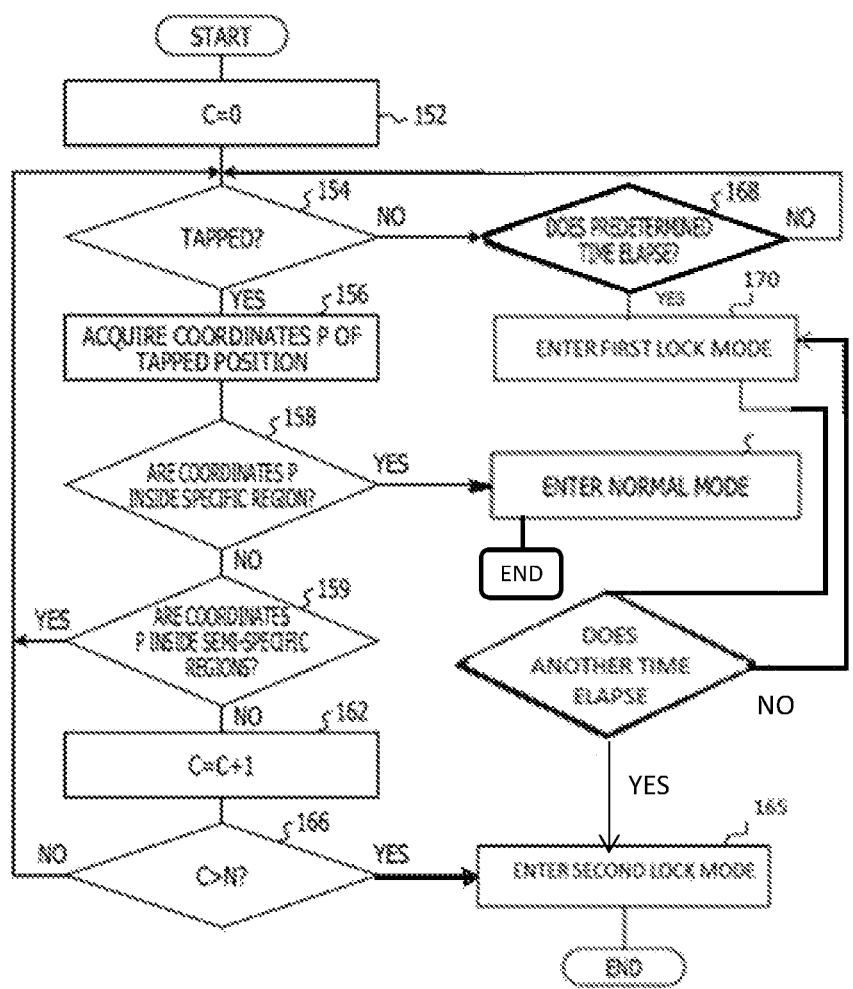
FIG. 7 is a flowchart illustrating an example of a flow of quick lock mode control processing according to a second embodiment.

With reference to FIG. 7, description is provide for the second embodiment of the quick lock mode control processing performed by a smart device 10 with a CPU 60 executing a quick lock mode control program 66A.

Figure 8:
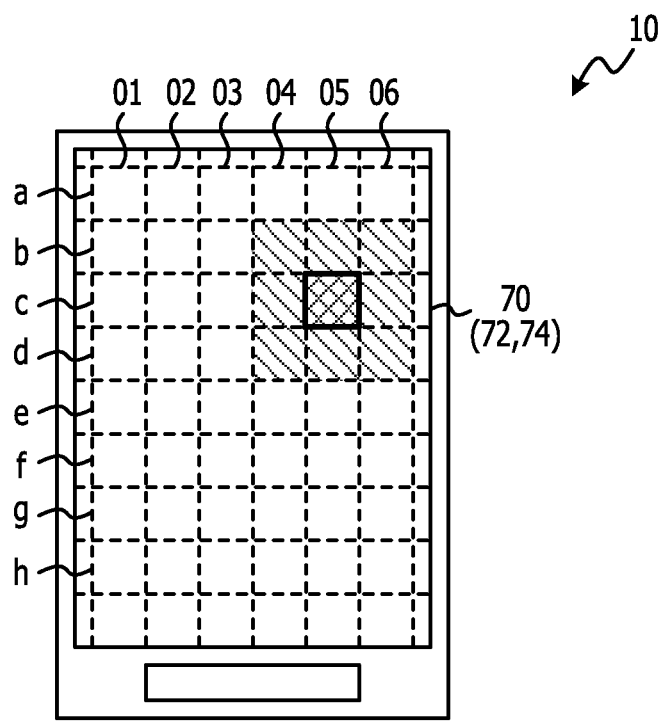
FIG. 8 is an illustration presenting an example of a specific region according to the second embodiment.

As illustrated in FIG. 8, the second embodiment is different from the first embodiment in that regions b04, b05, b06, c04, c06, d04, d05, and d06 surrounding a specific region c05 for cancelling the quick lock mode which is registered in advance are set as semi-specific regions. Even when user's tapping is detected in any of the semi-specific regions, the smart device 10 does not enter the normal mode unlike the case where user's tapping is detected in the specific region. On the other hand, even when user's tapping is detected in any of the semi-specific regions, the detected tapping is not counted as the number of times that the region other than the specific region is tapped.

In FIG. 7, the same steps as those in FIG. 5 are omitted in description herein. At step 154 in FIG. 7, it is detected whether user's tapping is detected on the touch panel display 70. When the determination result is "yes," the coordinates P of a position tapped by the user on the touch panel display 70 are acquired at step 156.

At step 158, it is determined whether the coordinates P are included inside the specific region c05 which is registered in the quick lock mode cancellation table 68 as the predetermined region for cancelling the quick lock mode illustrated in FIG. 8. When the determination result is "yes" at step 158, the quick lock mode is cancelled and shifted to the normal mode and the display 72 is turned on at step 160. Then, the quick lock mode control processing is terminated. It is noted that FIG. 8 is a diagram illustrating the specific region and the semi-specific regions, and presents the grid and the regions registered as the specific region and the semi-specific regions for facilitating understanding. However, in the quick lock mode, the display 72 is turned off and does not display the grid.

On the other hand, when the determination result is "no" at step 158, it is determined at step 159 whether the coordinates P are included in any of the semi-specific regions. When the determination result is "yes" at step 159, the control is returned to step 154. The value of the variable C is not incremented.

When the determination result is "no" at step 159, the value of the variable C is incremented by 1 at step 162.

In the disclosed technique, the regions b04, b05, b06, c045, c06, d04, d05, and d06 are set as the semi-specific regions. However, the disclosed technique is not limited to this. The semi-specific regions may further include regions b03, c03, and d03, for example. Also, in the disclosed technique, the specific region is surrounded by the semi-specific regions, but the disclosed technique is not limited to this. The semi-specific regions may be regions adjacent to the specific region, such as regions b04, c04, and d04.

In the above description, a width of each of the semi-specific regions surrounding the specific region is one grid pitch. However, the disclosed technique is not limited to this. For example, the width of the semi-specific regions may be set to a half grid pitch, a 1.5-time grid pitch, or the like.

The disclosed technique enables the quick lock mode to be cancelled upon detection of a touch operation in the specific region which is stored in advance. The operation of cancelling the quick lock mode imposes a less load on a user than in the case of cancelling the lock mode, but other people who do not know the specific region may have much more difficulty in cancelling the quick lock mode than in cancelling the sleep mode. The disclosed technique provides the quick lock mode which imposes a less load for cancellation than the lock mode without impairment of the protection function. Thus, the utilization of the protection function by the user is promoted. This is because the quick lock mode lowers the barrier to setting the smart device 10 to enter the quick lock mode when the touch panel 74 does not detect a user's operation for a relatively short time (for example, 15 seconds) or longer.

Further, in the disclosed technique, when the predetermined time elapses after the shift to the quick lock mode, or when the touch operation is performed in the region other than the specific or the semi-specific regions more than the predetermined number of times, the smart device 10 enters the lock mode. Accordingly, the protection function is enhanced.

Furthermore, in the disclosed technique, when a touch operation is performed in any of the semi-specific regions surrounding the specific region, the touch operation is not counted as the number of times that a touch operation is performed in the region other than the specific region. If the user has a vague memory of the position of the specific region, the user may perform a touch operation near the specific region and may fail to cancel the quick lock mode. However, the disclosed technique lowers the possibility that such cancellation failure may cause a shift to the lock mode. Thus, the load on the user may be further reduced.

Third Embodiment

In a third embodiment, the components described in the first and second embodiments are given the same reference numerals and are omitted in explanation.

Figure 9:
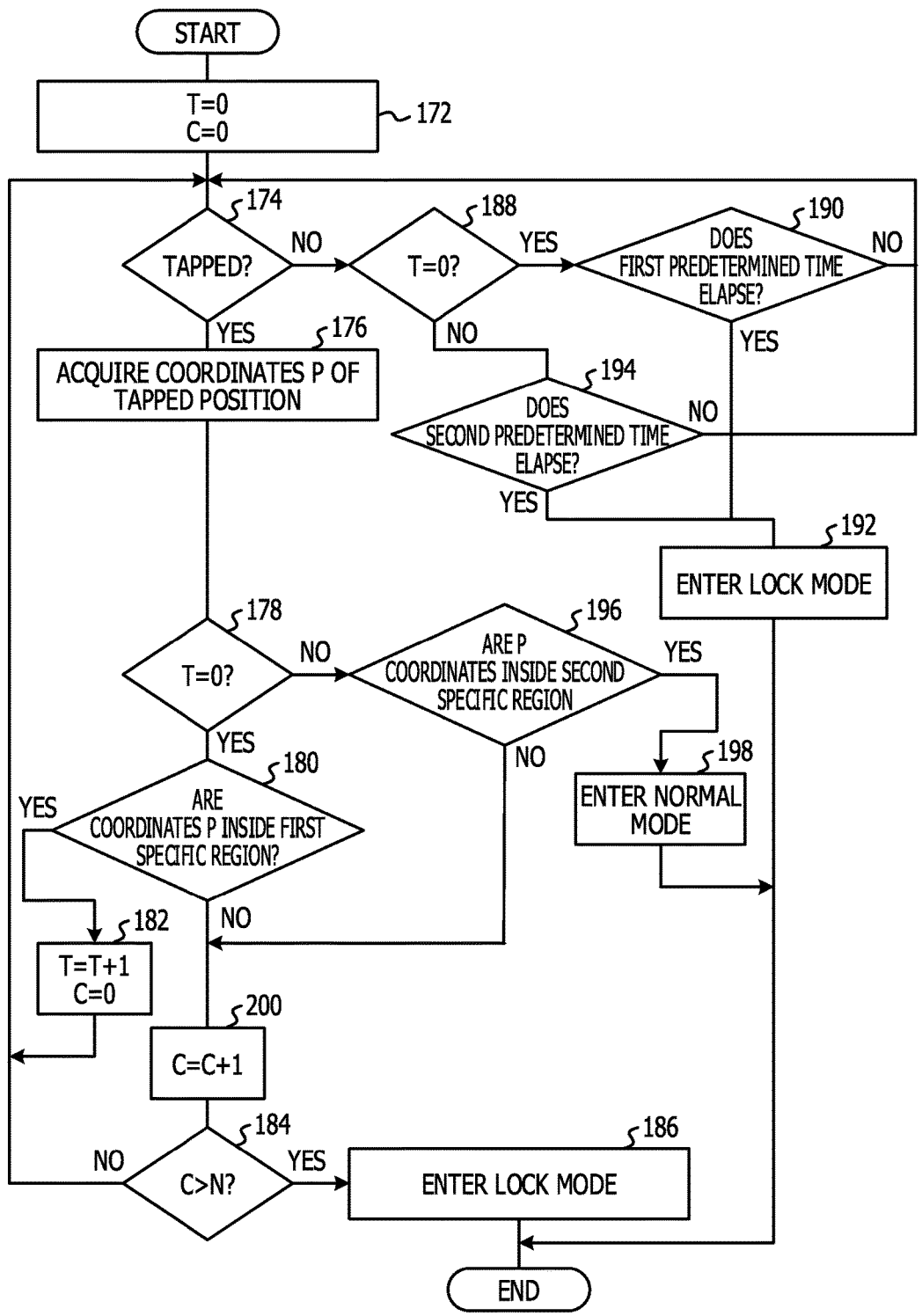
FIG. 9 is a flowchart illustrating an example of a flow of quick lock mode control processing according to a third embodiment.

With reference to FIG. 9, description is provided for the third embodiment of the quick lock mode control processing performed by a smart device 10 with a CPU 60 executing a quick lock mode control program 66A.

Figure 10:
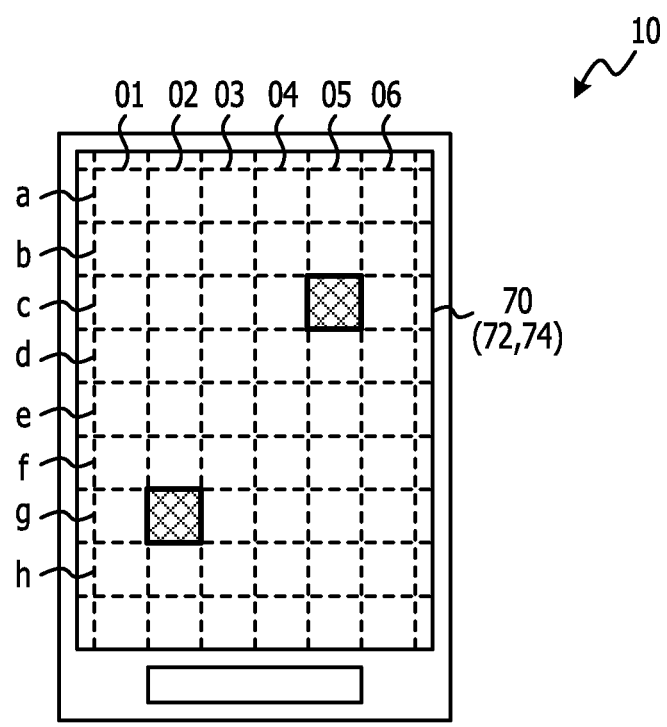
FIG. 10 is an illustration presenting an example of a specific region according to the third embodiment.

The third embodiment is different from the first embodiment in that a specific region for cancelling a quick lock mode which is registered in a quick lock mode cancellation table 68 in advance is not a single one, but two regions, that is, a first specific region c05 and a second specific region g02 are registered, as illustrated in FIG. 10. When user's tapping is detected in both the first specific region c05 and the second specific region g02, the quick lock mode is cancelled.

When a touch panel display 70 does not detect a user's operation for a predetermined time or longer, a quick lock function operates to shift to the quick lock mode and to power off a display 72. Then, quick lock mode control processing illustrated in FIG. 9 is started.

At step 172, "0" is set in a variable C and a variable T. The variable C is used for counting the number of times that a region other than the first specific region c05 and the second specific region g02 is tapped. The variable T is used for determining whether tapping on the first specific region c05 is already detected.

At step 174, it is detected whether user's tapping is detected on the touch panel display 70. When the determination result is "no," it is determined at step 188 whether the variable T is "0." The variable T of "0" means that the user's tapping is not yet detected in the first specific region c05. In the case where the variable T is "0," it is determined at step 190 whether a time measured by a timer 22 after the shift to the quick lock mode reaches a first predetermined time.

When the determination result is "no" at step 190, the control is returned to step 174.

When the determination result is "yes" at step 190, in other words, when the time measured by the timer 22 reaches the first predetermined time while the user's tapping is not yet detected in the first specific region c05, the smart device 10 enters the lock mode at step 192.

When the determination result is "yes" at step 174, the coordinates P in a position tapped by the user on the touch panel display 70 are acquired at step 176.

At step 178, it is determined whether the variable T is "0." When the variable T is "0," in other words, when the user's tapping is not yet detected in the first specific region c05, it is determined at step 180 whether the coordinates P are included inside the first specific region c05. When the determination result is "yes" at step 180, the variable T is incremented by 1 and the variable C is set to "0" at step 182. Then, the control is returned to step 174.

When the determination result is "no" at step 180, in other words, when the user's tapping is detected in the region other than the first specific region c05, the value of the variable C is incremented by 1 at step 200. At step 184, it is determined whether the value of the variable C exceeds a predetermined threshold N. When the determination result is "no," the control is returned to step 174.

The determination result of "yes" at step 184 means that the region other than the first specific region c05 is tapped a number of times more than the predetermined threshold N. Accordingly, the smart device 10 enters the lock mode at step 186.

On the other hand, the determination result of "no" at step 178, in other words, the variable T of "1" means that the user's tapping is already detected in the first specific region c05. Accordingly, at step 196, it is determined whether the coordinates P are included inside the second specific region g02. If the determination result is "yes," this means that the user's tapping is detected in both the first specific region c05 and the second specific region g02. Thus, at step 198, the smart device 10 enters a normal mode and turns on the display 72. Then, the quick lock mode control processing is terminated.

On the other hand, when the determination result is "no" at step 196, in other words, when the user's tapping is detected in the region other than the second region g02, the value of the variable C is incremented by 1. It is determined at step 184 whether the value of the variable C exceeds the threshold N. When the determination result is "no," the control is returned to step 174.

If the determination result is "yes" at step 184, this means that the region other than the second specific region g02 is tapped the number of times more than the predetermined threshold N. For this reason, the smart device 10 enters the lock mode at step 186.

At step 188, it is determined whether the variable T is "0" as described above. The determination result of "no," in other words, the variable T of "1" means that the user's tapping is already detected in the first specific region c05. In this case, it is determined at step 194 whether a time measured by the timer 22 after the tapping of the first specific region c05 reaches a second predetermined time. The second predetermined time may be set to be shorter than the first predetermined time, for example.

When the determination result is "no" at step 194, the control is returned to step 174. When the determination result is "yes" at step 194, the smart device 10 enters the lock mode at step 192.

In the above description, the first specific region c05 and the second specific region g02 are set as two specific regions, but the disclosed technique is not limited to this. For example, three or more specific regions may be set.

In the above description, the user's tapping is detected in the second specific region g02 after the user's tapping is detected in the first specific region c05. However, the disclosed technique is not limited to this. For example, in the case where two or more specific regions are set, the quick lock mode may be cancelled if the user's tapping is detected in all the specific regions in a random order. Alternatively, the quick lock mode may be cancelled only if simultaneous tapping in the two or more specific regions is detected.

In the case where two or more specific regions are set, the specific region registration processing illustrated in FIG. 3 is modified such that steps 204 to 218 are repeated a number of times equal to the number of specific regions, so that the two or more specific regions are set in the quick lock mode cancellation table 68.

The second embodiment may be applied to the third embodiment. To be more specific, when user's tapping is detected in any of first semi-specific regions surrounding the first specific region or when user's tapping is detected in any of second semi-specific regions surrounding the second specific region, step 200 may be modified such that the value of the C is not incremented. In other words, it is also possible that the user's tapping is not counted as the number of times that the region other than the specific region is tapped.

In the first to third embodiments, the quick lock mode control processing illustrated in FIGS. 5, 7, and 9 is performed in a state where the smart device 10 enters the quick lock mode and the display 72 is powered off. However, the disclosed technique is not limited to this. For example, if the disclosed technique is applied to a personal computer, the quick lock mode control processing may be started while a display is powered on in response to pressing down of a hardware key such as an Enter key. If the disclosed technique is applied to a personal computer, a click of a mouse in a specific region of the display may be detected in place of user's tapping detected on the touch panel display 70.

In the first to third embodiments, the quick lock mode control processing illustrated in FIGS. 5, 7, and 9 is performed in a state where the smart device 10 enters the quick lock mode and the display 72 is powered off. However, the disclosed technique is not limited to this. For example, when a user's touch operation is detected on the touch panel display 70, the display 72 may be firstly powered on. In this case, the display 72 may display only a single color or any image (for example, a photograph, an illustration or the like). In the case where a certain image is displayed, the displayed image may be nothing to do with the specific region or give a hint of the specific region. Instead, the display 72 may display the grid, which is displayed in the specific region registration processing.

The disclosed technique enables the quick lock mode to be cancelled upon detection of a touch operation in the specific region which is stored in advance. The operation of cancelling the quick lock mode imposes a less load on a user than in the case of cancelling the lock mode, but other people who do not know the specific region may have much more difficulty in cancelling the quick lock mode than in cancelling the sleep mode. The disclosed technique provides the quick lock mode which imposes a less load for cancellation than the lock mode without impairment of the protection function. Thus, the utilization of the protection function by the user is promoted. This is because the quick lock mode lowers the barrier to setting the smart device 10 to enter the quick lock mode when the touch panel 74 does not detect a user's operation for a relatively short time (for example, 15 seconds) or longer.

Moreover, in the disclosed technique, when the predetermined time elapses after the shift to the quick lock mode, or when the touch operation is performed in the region other than the specific region more than the predetermined number of times, the smart device 10 enters the lock mode. Accordingly, the protection function is enhanced.

Furthermore, setting two or more specific regions may lower the possibility that the quick lock mode may be cancelled in response to detection of an accidental touch operation in a specific region. Thus, the protection function is even further enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A device including a display screen, the device having a plurality of lock modes with respect to the display screen, comprising:
a memory; and
a processor coupled to the memory and configured to:
determine that the device is set to a first lock mode among the plurality of lock modes when an operation by a user during a non-lock mode is undetected for a first time period, the display screen being maintained in an off state through the first lock mode, switch the device from the first lock mode to a second lock mode among the plurality of lock modes when an operation by the user while the display screen is in the off state during the first lock mode is undetected for a second time period, and return the device from the first lock mode during which the display screen is in the off state to the non-lock mode when determining an input is detected inside an area of the display screen within the second time period, the computer being in the first lock mode when the input detected is inside at least one of regions associated with the area, wherein, while the computer is in the first lock mode, the switching switches the computer from the first lock mode to the second lock mode when the determining determines the input as a number of inputs outside both the area and the at least one of regions.

2. The device according to claim 1, wherein the processor is configured to:

acquire a touch position when a touch operation is detected on the display screen during the first lock mode, and determine whether the touch position is included in the area of the display screen, wherein the device is returned from the first lock mode to the non-lock mode when determining that the touch position is included in the area.

3. The device according to claim 2, wherein the processor is configured to:

shift the device from the first lock mode to the second lock mode, when determining that the touch position is outside the area.

4. The device according to claim 3, wherein the device is shifted from the first lock mode to the second lock mode when a number of touch positions that are designated outside the area is greater than a threshold.

5. The device according to claim 4, wherein the at least one of regions is nearby the area, and the processor is configured to determine whether a touch position inside the at least one of regions when the touch position is determined to be outside the area, and a number of touch positions are counted up when determining the touch position is outside the at least one of regions.

6. The device according to claim 1, wherein the processor is configured to:

receive a designation of a certain position on the display screen, display the area including the certain position, and store information regarding the area into the memory when an instruction of completion is received.

7. The device according to claim 1, wherein the display screen includes a touch panel and a display.

8. The device according to claim 7, wherein the processor is configured to:

set the touch panel on and the display off during the first lock mode and the second lock mode, and set the touch panel and the display on during the non-lock mode.

9. The device according to claim 1, wherein the device implements the non-lock mode, the first lock mode and the second lock mode in a sequential order after inactivity over a time period greater than the second time period.

10. A method of controlling a computer including a display screen, the computer having a plurality of lock modes with respect to the display screen, comprising:

determining that the computer is set to a first lock mode among the plurality of lock modes when an operation by a user during a non-lock mode is undetected for a first time period, the display screen being maintained in an off state through the first lock mode;

switching the computer from the first lock mode to a second lock mode among the plurality of lock modes when an operation by the user while the display screen is in the off state during the first lock mode is undetected for a second time period; and returning, by a processor in the computer, the computer from the first lock mode during which the display screen is in the off state to the non-lock mode when determining an input is detected inside an area of the display screen within the second time period, the computer being in the first lock mode when the input detected is inside at least one of regions associated with the area, wherein, while the computer is in the first lock mode, the switching switches the computer from the first lock mode to the second lock mode when the determining determines the input as a number of inputs outside both the area and the at least one of regions.

11. The method according to claim 10, further comprising:

acquiring a touch position when a touch operation is detected on the display screen during the first lock mode; and determining whether the touch position is included in the area of the display screen, wherein the returning of the computer is executed when determining that the touch position is included in the area.

12. The method according to claim 11, further comprising:

shifting the computer from the first lock mode to the second lock mode, when determining that the touch position is outside the area.

13. The method according to claim 12, wherein the computer is shifted from the first lock mode to the second lock mode when a number of touch positions of the number of inputs outside the area and the at least one of regions is greater than a threshold.

14. The method according to claim 13, wherein the at least one of regions is nearby the area, and the method further comprising:

determining whether a touch position is inside the at least one of regions when the touch position is determined to be outside the area, wherein a number of touch positions are counted up when determining the touch position is outside the at least one of regions.

15. The method according to claim 10, further comprising:

receiving a designation of a certain position on the display screen;

displaying the area including the certain position; and storing information regarding the area into a memory when an instruction of completion is received.

16. The method according to claim 10, wherein the display screen includes a touch panel and a display.

17. The method according to claim 16, further comprising:

setting the touch panel on and the display off during the first lock mode and the second lock mode; and setting the touch panel and the display on during the non-lock mode.

18. The method according to claim 10, wherein the computer implements the non-lock mode, the first lock mode and the second lock mode in a sequential order after inactivity over a time period greater than the second time period.

19. The method according to claim 10, further comprising:
   returning the computer from the second lock mode to the non-lock mode when another input of a certain password or a certain pattern is detected.

20. A non-transitory computer-readable medium storing a program of controlling a computer including a display screen, the computer having a plurality of lock modes with respect to the display screen, the program which when executed by a processor, causes the computer to:
   determine that the computer is set to a first lock mode among the plurality of lock modes when an operation by a user during a non-lock mode is undetected for a first time period, the display screen being maintained in an off state through the first lock mode;
   switch the computer from the first lock mode to a second lock mode among the plurality of lock modes when an operation by the user while the display screen is in the off state during the first lock mode is undetected for a second time period; and
   return the computer from the first lock mode to the non-lock mode when determining an input is detected inside area of the display screen under the first lock mode is detected within the second time period, the computer being in the first lock mode when the input detected is inside at least one of regions associated with the area,
   wherein, while the computer is in the first lock mode, the switching switches the computer from the first lock mode to the second lock mode when the determining determines the input as a number of inputs outside both the area and the at least one of regions.

* * * * *